(12) United States Patent
Sachdev et al.

(10) Patent No.: US 8,866,044 B2
(45) Date of Patent: Oct. 21, 2014

(54) SYSTEM AND METHOD FOR MANUFACTURING MAGNESIUM BODY PANELS WITH IMPROVED CORROSION RESISTANCE

(75) Inventors: Anil K. Sachdev, Rochester Hills, MI (US); Jon T. Carter, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 399 days.

(21) Appl. No.: 13/100,497

(22) Filed: May 4, 2011

(65) Prior Publication Data
US 2012/0280535 A1 Nov. 8, 2012

(51) Int. Cl.
*B23K 26/40* (2014.01)
*B23K 26/38* (2014.01)

(52) U.S. Cl.
CPC .............. *B23K 26/38* (2013.01); *B23K 2203/08* (2013.01); *B23K 2201/006* (2013.01)
USPC .................................... 219/121.72

(58) Field of Classification Search
USPC ............. 148/525, 565, 666, 667; 219/121.72, 219/121.67, 121.65, 121.66, 121.8; 72/47
See application file for complete search history.

(56) References Cited

U.S. PATENT DOCUMENTS

| | | | | |
|---|---|---|---|---|
| 3,696,503 A | * | 10/1972 | Krengel et al. ................. | 72/47 |
| 4,323,756 A | * | 4/1982 | Brown et al. ............. | 219/121.66 |
| 4,401,726 A | * | 8/1983 | Gnanamuthu ........... | 219/121.66 |
| 4,945,207 A | * | 7/1990 | Arai ......................... | 219/121.72 |
| 5,164,565 A | * | 11/1992 | Addiego et al. .......... | 219/121.68 |
| 6,454,877 B1 | * | 9/2002 | Kumar et al. ............. | 219/121.66 |
| 8,231,936 B2 | | 7/2012 | Song et al. | |
| 2006/0006157 A1 | * | 1/2006 | Oldani ...................... | 219/121.64 |
| 2008/0207767 A1 | | 8/2008 | Dobos et al. | |
| 2008/0269872 A1 | * | 10/2008 | Lootz et al. .................. | 623/1.15 |

(Continued)

FOREIGN PATENT DOCUMENTS

| CN | 101310703 A | 11/2008 |
|---|---|---|
| CN | 101683710 A | 3/2010 |

(Continued)

OTHER PUBLICATIONS

Machine translation of Japan Patent Document No. 2010-023,051-A, Sep. 2013.*

(Continued)

*Primary Examiner* — Geoffrey S Evans
(74) *Attorney, Agent, or Firm* — Harness, Dickey & Pierce, P.L.C.

(57) ABSTRACT

A magnesium alloy panel for a vehicle includes a first region and a second region extending from the first region to an edge. The first region has a first microstructure having a first corrosion resistance. The second region has a second microstructure different than the first microstructure and has a second corrosion resistance greater than the first corrosion resistance. A system for mass producing magnesium alloy panels includes a forming apparatus and a laser cutting apparatus. The forming apparatus forms a panel having a first microstructure having a first corrosion resistance. The laser cutting apparatus cuts the panel to form the edge using a laser, and forms the second microstructure while forming the edge. The second microstructure is different than the first microstructure and has a second corrosion resistance greater than the first corrosion resistance. A method for mass producing magnesium alloy panels is also provided.

20 Claims, 3 Drawing Sheets

(56) References Cited

U.S. PATENT DOCUMENTS

2008/0309151 A1    12/2008  Kleber et al.
2009/0039060 A1*   2/2009   Palmquist et al. ....... 219/121.69
2009/0278396 A1    11/2009  Krajewski et al.
2010/0024924 A1*   2/2010   Krajewski et al. ............ 148/510
2010/0237050 A1*   9/2010   Zehavi ..................... 219/121.47
2011/0089749 A1    4/2011   Kleber et al.
2012/0064251 A1    3/2012   Song
2012/0067465 A1    3/2012   Song et al.
2012/0112486 A1*   5/2012   Fuetterer et al. ................... 72/47
2012/0152409 A1*   6/2012   Sachdeva et al. ............. 148/241
2013/0078480 A1*   3/2013   Sachdev et al. ................... 72/47

FOREIGN PATENT DOCUMENTS

| CN | 102764990 | | 11/2012 |
|---|---|---|---|
| DE | 19854213 C1 | * | 4/2000 |
| DE | 10235903 A1 | * | 2/2004 |
| DE | 102012207197 | | 11/2012 |
| EP | 0209488 A1 | | 1/1987 |
| EP | 299488 A1 | * | 1/1987 |
| JP | 2002-363721 A | * | 12/2002 |
| JP | 2006-88435 A | * | 4/2006 |
| JP | 2010-023051 A | * | 2/2010 |
| WO | WO-2009/097882 A1 | * | 5/2009 |

OTHER PUBLICATIONS

Machine translation of Japan Patent document No. 2002-363,721, Feb. 2014.*

Machine translation of Japan Patent document No. 2006-88,435, Feb. 2014.*

Ignat et al., "Magnesium alloys laser (Nd:YAG) cladding and alloying with side injection of aluminum powder", Jan. 2004, Elsevier, Applied Surface Science, vol. 225, pp. 124-134.*

Gray et al., Protective coatings on magnesium and its alloys—a critical review, Jan. 2002, Elsevier, Journal of Alloys and Compounds vol. 336, pp. 88-113.*

* cited by examiner

SYSTEM AND METHOD FOR MANUFACTURING MAGNESIUM BODY PANELS WITH IMPROVED CORROSION RESISTANCE

FIELD

The present disclosure relates to systems and methods for manufacturing metal panels for vehicle bodies, and more particularly, to manufacturing systems and methods for producing a finished edge on magnesium body panels having improved corrosion resistance.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many automotive body panels are mass produced from wrought sheet metal, typically wrought steel alloys using a stamping process carried out by a stamping press. During the stamping process, a work piece is formed to a desired shape and cut to produce a sheet metal part. More specifically, forming dies are brought into contact with the work piece to deform the work piece into the desired shape and cutting dies shear the work piece.

Some automotive body panels are mass produced from cast metal using a casting process carried out by a casting machine. Typically, the metal is an alloy of aluminum or magnesium, and the casting process is a high-pressure die casting process. During the casting process, molten metal is poured into a mold defining a semi-finished shape of the panel and allowed to cool to solidify. The solidified part is then removed from the mold and trimmed and/or pierced using one or more presses and hardened tools. In automotive bodies, cast panels conventionally are used as inner panels, rather than exterior panels, on door assemblies and lift gates.

However, some steel alloys and cast magnesium alloys used to make the automotive body panels have low corrosion resistance and corrode when exposed to moisture and various substances found in the environment, such as salt used to melt snow and ice on the roads. Accordingly, sheet metal parts used to create the panels may be coated with a thin layer of zinc by the steel supplier using a galvanizing process. After undergoing the forming process, the panels are typically cleaned and coated with a surface treatment including, for example, phosphate, electro-deposited epoxy, and paint. The surface treatment provides a barrier of corrosion-resistant material between the damaging environment and the sheet metal part.

SUMMARY

In one form, the present disclosure provides a manufacturing system for mass producing magnesium alloy panels. The manufacturing system includes a forming apparatus and a laser cutting apparatus. The forming apparatus forms a panel having a three dimensional shape and a first microstructure having a first corrosion resistance. The laser cutting apparatus cuts the panel to form an edge using a laser. The laser cutting apparatus forms a second microstructure in the panel while forming the edge. The second microstructure is different than the first microstructure and has a second corrosion resistance greater than the first corrosion resistance.

In various features, the manufacturing system further includes a feeding apparatus that adds an alloying element to a molten material in a cutting area generated by the laser cutting apparatus while cutting the panel. In one related feature, the alloying element is an alloying element present in the panel as received by the laser cutting apparatus. In another related feature, the alloying element is not present in the panel as received by the laser cutting apparatus.

In further features, the forming apparatus forms the panel by one of a hot metal gas forming process and a stamping process. In an alternate feature, the forming apparatus forms the panel by casting the panel. In still further features, the panel is composed of an alloy including at least one alloying element selected from a group consisting of aluminum, zinc, tin, and manganese.

In another form, the present disclosure provides a magnesium alloy panel for a vehicle. The panel includes a first region and a second region extending from the first region to an edge. The first region has a first microstructure having a first corrosion resistance. The second region has a second microstructure different than the first microstructure. The second microstructure has a second corrosion resistance greater than the first corrosion resistance.

In various features, the first microstructure has N phases and the second microstructure has N+M phases, N and M being integers greater than zero. In further features, the second region includes an intermetallic phase and a weight percentage of the intermetallic phase is greater in the second region than in the first region. In still further features, the second microstructure includes an intermetallic phase including aluminum. In yet further features, the first region is composed of a ternary alloy including aluminum and zinc as alloying elements.

In another form, the present disclosure provides a method for mass producing magnesium alloy panels. The method includes forming a panel having a first microstructure having a first corrosion resistance. The method further includes cutting the panel to form an edge using a laser. The method further includes forming a second microstructure in the panel while cutting the panel to form the edge. The second microstructure is different than the first microstructure and has a second corrosion resistance greater than the first corrosion resistance.

In various features, the method further includes adding an alloying element to a molten material in a cutting area generated while cutting the panel to form the edge. In one related feature, the alloying element is an alloying element present in the panel when forming the panel. In another related feature, the alloying element is not present in the panel when forming the panel. In further features, the method further includes forming the panel using one of a hot metal gas forming process, a stamping process, and a casting process. In still further features, the panel is composed of an alloy including at least one alloying element selected from a group consisting of aluminum, zinc, tin, and manganese.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
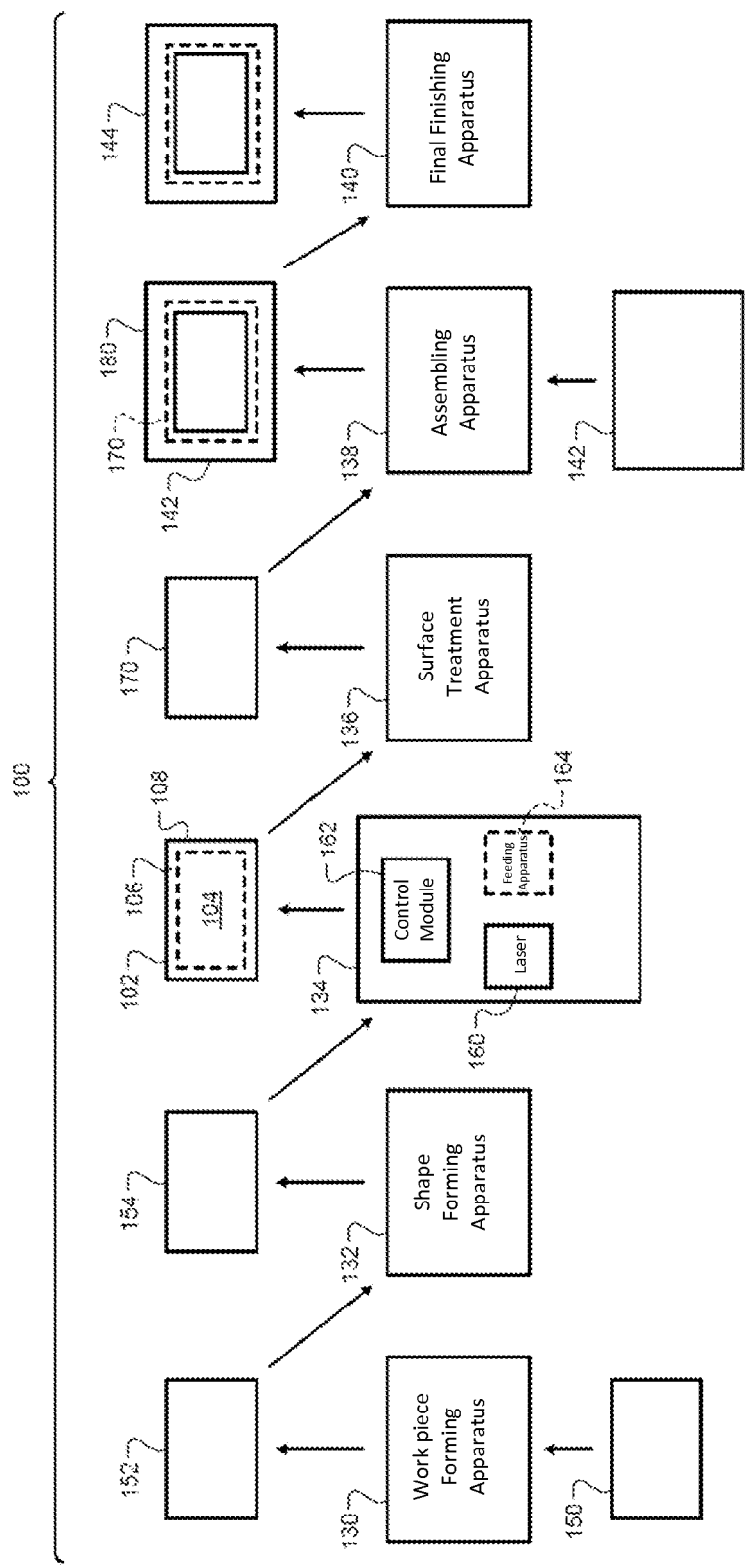
FIG. 1 is a block diagram illustrating an exemplary manufacturing system for mass producing sheet metal panels using a wrought magnesium alloy according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As an alternative to steel, magnesium alloys may be used to produce automotive body panels of high strength and reduced weight. For example, magnesium alloys including aluminum and zinc may be used. Although some alloying elements, such as aluminum and zinc alone may be more corrosion resistant than magnesium, in wrought form, magnesium alloys generally have low corrosion resistance and must be coated with a surface treatment to inhibit corrosion. The low corrosion resistance is due to a single phase microstructure of the sheet metal in which the alloying elements are uniformly dissolved in the magnesium.

Cast magnesium alloys generally contain at least two discrete phases due to increased weight percentages of alloying elements and phase separation during solidification. Intermetallic phases, such as phases containing aluminum, can impart corrosion resistance to a cast panel and, as a result, cast panels can have more corrosion resistance than wrought panels with a similar composition. The difference in corrosion resistance is because hot working used to produce the wrought sheet metal dissolves the intermetallic phases in the surrounding magnesium matrix. However, increased weight percentages of the alloying elements can reduce the castability of magnesium alloys. As a result, cast magnesium panels formed from suitable alloys may not provide a desired corrosion resistance, and may be coated with a surface treatment to inhibit corrosion.

Surface treatments can be used to provide additional corrosion resistance to both wrought magnesium panels and cast magnesium panels. However, the surface treatments applied to the panels are susceptible to damage, such as chips and scratches, both during the manufacture of the panels and while the panels are in service. The surface treatments are particularly susceptible to damage at edges of the panels, where the surface treatments may be thin and less adherent and where manufacturing stresses are higher and are more likely to damage the surface treatments.

The present disclosure provides a manufacturing system and method for mass producing automotive vehicle panels from both wrought and cast magnesium alloys that offer improved corrosion resistance when compared to conventional systems and methods. The system includes a laser cutting apparatus that alters the microstructure of the panels while cutting the panels to form an edge. The laser cutting apparatus heats the panel and melts a thin layer within a cutting area that re-solidifies to create a multi-phase microstructure at the edge. The multi-phase microstructure is similar to a cast microstructure of the magnesium alloy and includes at least one intermetallic phase having increased corrosion resistance. The intermetallic phase provides the panel with improved corrosion resistance at the edge and reduces the need to rely on surface treatments for achieving the desired corrosion protection. The laser cutting apparatus can replace conventional devices used to produce a finished edge on a mass produced panel, such as shearing dies. Although laser cutting devices are generally considered to require more time to produce an edge than other conventional devices, the anti-corrosion benefits disclosed herein may outweigh any reductions to manufacturing efficiency in various applications.

With particular reference to FIG. 1, a block diagram illustrates an exemplary manufacturing system 100 for mass producing a sheet metal panel 102 with improved corrosion resistance from a wrought magnesium alloy. The manufacturing system 100 may be used to produce panels from sheet metal having a thickness from, for example, less than one millimeter (1 mm) to approximately thirteen millimeters (13 mm), including all sub-ranges. As used herein, mass production refers to production of large amounts of standardized products for consumption by a consumer or end user, for example. Typically, mass production will be carried out in a manufacturing facility dedicated for such purposes, and designed to produce the products in large quantities sufficient to meet market demand. In the automotive setting, manufacturing facilities may be designed to produce more than one hundred thousand units or, more particularly, between two to three hundred thousand units.

According to the present non-limiting example, the panel 102 is produced from a ternary aluminum-magnesium-zinc alloy, such as AZ31, AZ61, or AZ91. Although the wrought magnesium alloy of the present example includes alloying elements of aluminum and zinc, it will be appreciated that in various aspects of the present disclosure, other alloying elements are optionally used. For example, the other alloying elements include, but are not limited to, tin, manganese and rare earth metals. Still further, alloying elements include those known in the art as grain modifiers and those known in the art to modulate hardness, ductility, density, elongation, yield strength, and the like as non-limiting examples.

The panel 102 forms all or part of various structural and non-structural vehicle body panels including, but not limited to, underbody panels (e.g., floor panels and dash panels), body side panels (e.g., quarter panels), roof panels, and body closure panels (e.g., door, roof, and deck lid panels). Additionally, in various aspects, the panel 102 forms all or part of an outer body panel and/or an inner body panel. The panel 102 includes a central region 104 having a single phase microstructure and an adjoining peripheral region 106 having a multi-phase microstructure. The peripheral region 106 extends from the central region 104 to an edge 108. The peripheral region 106 may extend around the panel 102 in a continuous manner as shown, or extend along selected portions in an intermittent manner. The peripheral region 106 and the edge 108 are created using a laser welding apparatus, as discussed in more detail below. The edge 108 may be an outer edge as shown, or an inner edge defining an aperture or other opening within the panel 102.

Figure 2:
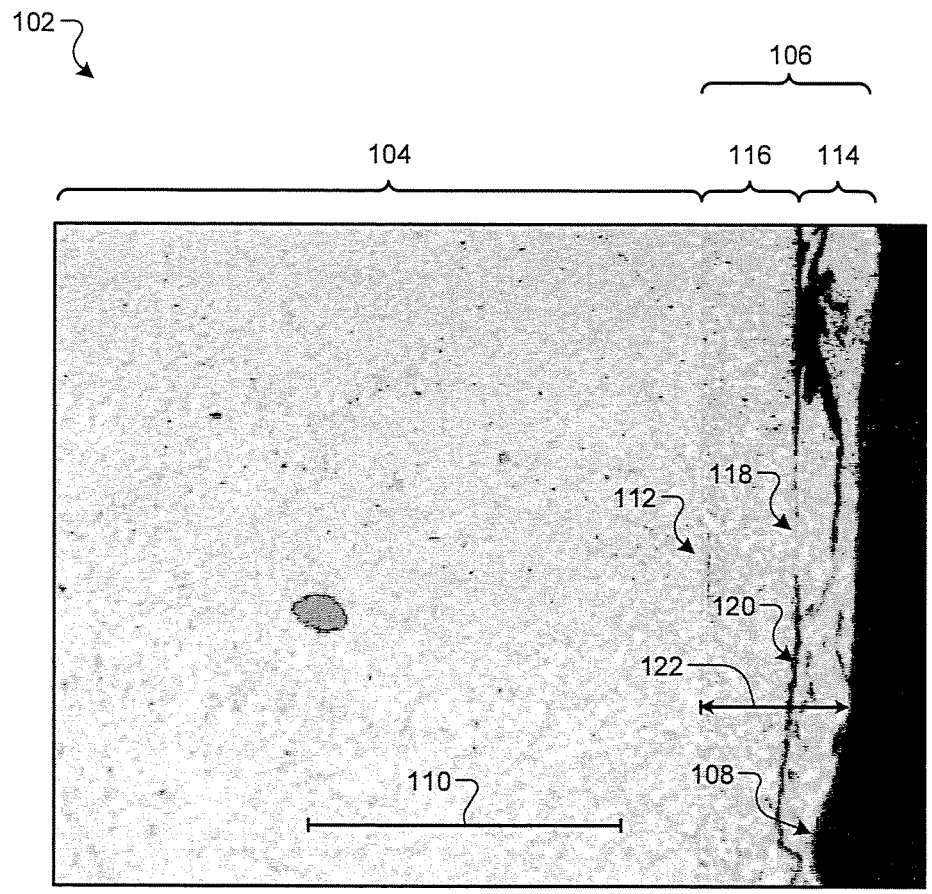
FIG. 2 is a magnified fragmentary view illustrating an exemplary microstructure of a wrought magnesium alloy panel according to the present disclosure.

With particular reference to FIG. 2, a magnified fragmentary view of an exemplary panel illustrates various features of the different microstructures of the central region 104 and the peripheral region 106. For reference, a line 110 illustrates a dimension of approximately forty micrometers (40 μm). A boundary between the central region 104 and the peripheral region 106 can be seen in FIG. 2 and is designated by reference numeral 112. The single phase microstructure of the central region 104 is typical of a microstructure of a rolled sheet metal formed of a wrought aluminum-magnesium-zinc alloy. The single phase microstructure of the central region 104 is a physically homogeneous region in which the aluminum and zinc alloying elements are well dissolved in the magnesium. The single phase microstructure is distinct from the adjoining multi-phase microstructure of the peripheral region 106.

The peripheral region 106 may be referred to as a recast layer, as it is created during melting and re-solidification of the base material during a laser cutting process. The peripheral region 106 includes an outer layer 114 and an intermediate layer 116. A boundary between the outer layer 114 and the intermediate layer 116 can be seen in FIG. 2 and is designated by reference numeral 118. The outer layer 114 includes fissures or cracks 120 that may form as the recast layer re-solidifies. In various implementations, the outer layer 114 is removed using an edge finishing process to give the edge 108 a relatively smooth finish. The intermediate layer 116 is relatively free from cracks. The intermediate layer 116, alone or in combination with the outer layer 114, has a width 122 between one percent (1%) and one hundred percent (100%) of the thickness of the sheet metal used to produce the panel 102, including all sub-ranges.

According to the present non-limiting example, the microstructure of the peripheral region 106 includes a magnesium-rich matrix phase and an intermetallic phase including aluminum. The magnesium-rich matrix phase includes physically homogeneous and distinct portions in which the magnesium is the primary constituent and a weight percentage of the magnesium is greater than that in the central region 104. The intermetallic phase includes physically homogeneous and distinct portions in which a weight percentage of the aluminum is greater than that in the central region 104 and that in the surrounding magnesium-rich matrix phase. The intermetallic phase includes Mg17Al12 particles or lamella or other lenticular shapes that are corrosion resistant and provide the peripheral region 106 with the increased corrosion resistance.

The intermetallic phase is present as discrete portions or islands surrounded by the magnesium-rich matrix phase and/or is present as a contiguous network. In various aspects, the intermetallic phase is dispersed relatively uniformly within the magnesium-rich matrix phase. In other aspects, the intermetallic phase increases in distribution (i.e., frequency of occurrence) in a direction from the central region 104 to the edge 108. In other words, a space between the discrete portions of the intermetallic phase decreases in a direction from the central region 104 to the edge 108. In still other aspects, portions of the intermetallic phase are disposed at the edge 108 and separate portions of the magnesium-rich matrix phase from the edge 108. In various implementations, the peripheral region 106 includes additional intermetallic phases depending on the number of alloying elements and various parameters of the laser cutting process.

Referring again to FIG. 1, the manufacturing system 100 includes a work piece forming apparatus 130, a shape forming apparatus 132, and a laser cutting apparatus 134 that cooperate to produce the panel 102. The manufacturing system 100 further includes a surface treatment apparatus 136, an assembling apparatus 138, and a final finishing apparatus 140. The surface treatment apparatus 136, the assembling apparatus 138, and the final finishing apparatus 140 cooperate to apply a surface treatment to the panel 102 and assemble the panel 102 to another panel 142 to create a finished panel assembly 144. In various aspects, the panel 142 is a sheet metal panel manufactured according to the present disclosure. Together, the panels 102, 142 form all or part of an inner and outer panel assembly, such as door inner and outer panel assembly.

The work piece forming apparatus 130 receives a raw material 150 to be used to produce the panel 102 and produces a generally flat work piece 152 that is delivered to the shape forming apparatus 132. The raw material 150 is a wrought aluminum-magnesium-zinc alloy material and is provided as a rolled sheet or in any other suitable form. Generally, the raw material 150 has a single phase microstructure and grain structure suitable for forming an overall desired shape of the panel 102. In various implementations, the work piece forming apparatus 130 cuts the work piece 152 from the raw material 150.

The shape forming apparatus 132 receives the work piece 152 and deforms the work piece 152 to produce a three-dimensional, shaped panel 154 having an overall desired shape of the panel 102. In various aspects, the shape forming apparatus 132 forms the shaped panel 154 by sheet metal forming methods suitable for wrought aluminum-magnesium-zinc alloys. For example, hot metal gas forming, stamping, bending, curling, decambering, deep drawing, incremental sheet forming, press brake forming, and punching methods are suitable for use with the present teachings.

The laser cutting apparatus 134 receives the shaped panel 154 and cuts the shaped panel 154 using one or more laser beams to produce the peripheral region 106 and the edge 108 of the panel 102. The laser cutting apparatus 134 is a separate apparatus from the shape forming apparatus 132 in select aspects. Alternately, in various aspects, the laser cutting apparatus 134 may be combined with the shape forming apparatus 132 to improve manufacturing efficiency. According to the present non-limiting example, the laser cutting apparatus 134 includes an automated, industrial laser 160 controlled by a control module 162 that, together, may form a robotic laser cutting cell. The laser 160 employs various lasers including, but not limited to, carbon dioxide (CO2) lasers, neodymium (Nd) lasers, and neodymium yttrium-aluminum-garnet (Nd-YAG) lasers. The laser 160 cuts the shaped panel 154 by directing a laser beam (or multiple beams) along a predetermined path. In various implementations, multiple laser beams directed along separate portions of the predetermined path are employed to increase manufacturing efficiency. The laser 160 directs the laser beam at predetermined linear cutting speeds to heat material impacted by the laser 160 to a predetermined temperature above a melting point of the material. The laser 160 causes material in the cutting area to melt and fall away, creating a kerf that produces the edge 108.

Generally, the laser cutting apparatus 134 performs the cutting operation in the ambient environment of a manufacturing facility at temperatures of around, for example, twenty degrees Celsius (20° C.). In various implementations, an inert gas is directed towards the cutting area under pressure to blow the molten material from the cutting area. Additionally, a feeding apparatus 164, or other suitable device, supplies an alloying element to the molten material of the cutting area to increase a concentration of an alloying element already present from the raw material 150 (e.g., aluminum) or add a new alloying element. In this way, the feeding apparatus 164 is used to increase the presence and continuity of the intermetallic phase or to create additional intermetallic phases within the peripheral region 106 of increased corrosion resistance. The feeding apparatus 164 supplies the alloying element by feeding the alloying element into the molten material of the cutting area. In various aspects, the feeding apparatus 164 is configured to feed the alloying element as a powder. In other aspects, the feeding apparatus 164 is configured to feed the alloying element as a solid wire.

The control module 162 controls operation of the laser 160. More specifically, the control module 162 controls the path and linear cutting speeds of the laser 160. The control module 162 further controls an energy of the laser 160. By controlling the path, the linear cutting speeds, and the energy of the laser, a heating rate and a melting rate within the cutting area may also be controlled. The heating rate and the melting rate are controlled to achieve the desired multi-phase microstructure and width (i.e., the width 122) of the peripheral region 106. The various operating parameters, including the linear cutting speeds and the laser energy, can be predetermined. For example, the operating parameters can be predetermined during a development phase of panel design and/or a validation phase of panel manufacture, based on testing to ensure the desired metallurgical properties of the peripheral region 106 are achieved.

The surface treatment apparatus 136 receives the panel 102 and applies a surface treatment to the panel 102 to produce a treated panel 170. The surface treatment provides a protective coating and promotes adhesion of a finish layer applied by the final finishing apparatus 140. According to the present non-limiting example, the surface treatment is applied to the entire surface of the panel 102, including the edge 108. In alternate implementations, the surface treatment may be selectively omitted in selected areas of the peripheral region 106, including the edge 108.

The surface treatment includes an electro-deposition coating applied by any electro-deposition process suitable for coating an aluminum-magnesium-zinc alloy. For example, a suitable electro-deposition process includes cleaning the panel 102 using a water-based solvent, such as an acid solvent or a base solvent, and then drying the panel 102. The panel 102 is then submerged in a bath of an electro-deposition solution under conditions in which an electrical potential is established between the panel 102 and paint particles suspended in the electro-deposition solution. The paint particles are attracted to the panel 102 and form a coating over a portion of or the entire surface of the panel 102. The panel 102 is then removed from the bath and heated to cure the coating.

The assembling apparatus 138 receives the treated panel 170 and assembles the panel 142 to the treated panel 170 to produce a panel assembly 180. In various aspects, the treated panel 170 and the panel 142 are joined using a hemming process in which a hem is formed to overlap the peripheral region 106. Alternately, or additionally, the treated panel 170 and the panel 142 are joined by a structural adhesive.

The final finishing apparatus 140 receives the panel assembly 180 and applies a finish coating to the panel assembly 180 to produce the finished panel assembly 144. The finish coating is any coating that provides selected areas of the finished panel assembly 144 with a desired appearance or functionality. As a non-limiting example, the finish coating is a polymer paint coating optionally including a base coat and/or a clear coat.

Figure 3:
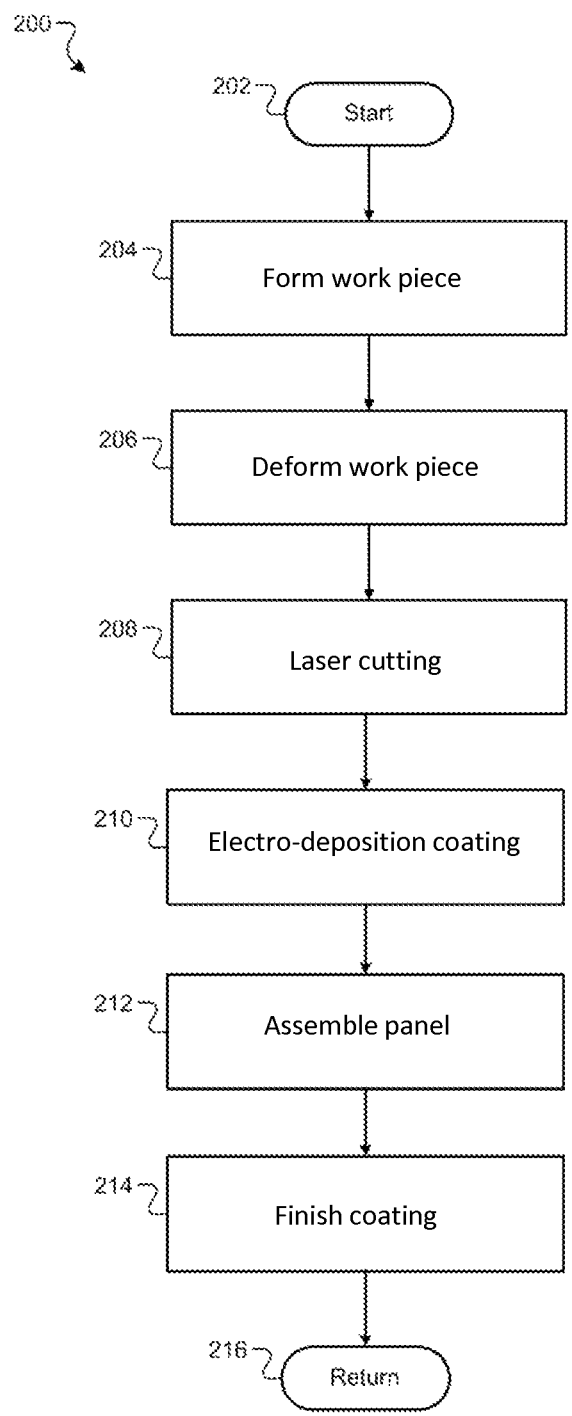
FIG. 3 is a flow diagram illustrating an exemplary method for mass producing sheet metal panels using a wrought magnesium alloy according to the present disclosure.

With particular reference to FIG. 3, a flow diagram illustrates an exemplary method 200 for mass producing a sheet metal panel with improved corrosion resistance from a wrought magnesium alloy. In various aspects, the method 200 is implemented by a manufacturing system, such as the manufacturing system 100 discussed above, to mass produce a panel, such as the panel 102. Accordingly, for simplicity, the method 200 will be described with reference to the various components of the manufacturing system 100 and the panel 102.

A start of the method is designated at 202. At 204, the work piece forming apparatus 130 forms the work piece 152 from the wrought magnesium alloy of the raw material 150. At 206, the shape forming apparatus 132 deforms the work piece 152 to form the shaped panel 154 having the overall desired three dimensional shape of the panel 102. At 208, the laser cutting apparatus 134 cuts the shaped panel 154 using the predetermined laser cutting process to form the edge 108 on the panel 102. During the laser cutting process, the laser cutting apparatus 134 alters the single phase microstructure of the shaped panel 154 in the peripheral region 106 to produce the multi-phase microstructure adjoining the edge 108. In various implementations, the method 200 may further include the laser cutting apparatus 134 adding one or more additional alloying elements to the molten material of the cutting area to promote the formation and continuity of intermetallic phases. At 210, the surface treatment apparatus 136 applies the electro-deposition coating to the panel 102 to produce the treated panel 170. At 212, the assembling apparatus 138 joins the panel 142 to the treated panel 170 to form the panel assembly 180. At 214, the final finishing apparatus 140 applies the finish coating to the panel assembly 180 to produce the finished panel assembly 144. At 216, the method returns to the start at 202 to begin production of another panel 102.

According to the present disclosure, a cast panel including an edge with improved corrosion can be formed by laser cutting an as-cast panel or work piece. The cast panel may form all or part of various structural and non-structural panels including, but not limited to, vehicle body panels. The as-cast panel is formed using a casting process suitable for casting a magnesium alloy. The as-cast panel is cast to have an overall desired shape of the cast panel and includes a first multi-phase microstructure formed during the casting process. During the laser cutting process used to form the edge, a thin layer within a cutting area melts and re-solidifies and a second, multi-phase microstructure is created. The second multi-phase microstructure is different from the first microstructure and has improved corrosion-resistance. In various aspects, the edge is an outer peripheral edge or an inner edge defining an aperture or other opening within the cast panel.

According to the present non-limiting example, the cast panel is formed from a ternary aluminum-magnesium-zinc alloy such as AZ63, AZ81, or AZ91. Alloying elements of aluminum and zinc have anti-corrosive properties and are used to facilitate the formation of the second multi-phase microstructure. In various aspects of the present disclosure, other alloying elements are optionally or additionally used. For example, other alloying elements include, but are not limited to, tin, manganese, and rare earth metals. In one example, an aluminum-magnesium-manganese alloy such as AM60 is used. Still further, alloying elements include grain modifiers and other alloying elements known in the art to modulate hardness, ductility, density, elongation, yield strength, and the like. Weight percentages of the alloying elements are selected to provide the cast panel with desired properties including, for example, castability properties and mechanical properties. By forming the edge to have a greater corrosion resistance than the rest of the cast panel, it will be appreciated that a lower weight percentage of one or more of the alloying elements may be used to improve castability of the as-cast panel.

The cast panel includes a central region having the first multi-phase microstructure and a peripheral region having the second multi-phase microstructure. The peripheral region extends from the central region to the edge. The central region may be referred to as an as-cast layer, as it is created during the casting process used to form the as-cast panel. The first multi-phase microstructure of the central region includes at least one intermetallic phase dispersed within a magnesium-rich matrix phase. One or more intermetallic phases may be present depending on a number of alloying elements of a casting material and various parameters of the casting process. According to the present non-limiting example, the first multi-phase microstructure includes an intermetallic phase of $Mg_{17}Al_{12}$ particles or lamella or other lenticular shapes dispersed throughout the magnesium-rich matrix phase. The $Mg_{17}Al_{12}$ particles have a distribution (i.e., a frequency of occurrence) that is based on the casting process. The distribution can be increased or decreased by varying one or more parameters of the casting process. For example, a casting temperature and a cooling rate can be varied to achieve a desired distribution.

The peripheral region may be referred to as a re-cast layer, as it is created during melting and re-solidification of the base material during the laser cutting process used to create the edge. The peripheral region has a width between one percent (1%) and one hundred percent (100%) of a thickness of the cast panel in the peripheral region. The second multi-phase microstructure of the peripheral region includes at least one corrosion-resistant intermetallic phase dispersed within a magnesium-rich matrix phase. The intermetallic phase of the second multi-phase microstructure may be present in the first multi-phase microstructure or, alternatively, may be an additional phase created during the laser cutting process. Accordingly, in various aspects, the second multi-phase microstructure includes a greater number of intermetallic phases than the first multi-phase microstructure. Additional intermetallic phases can be created, for example, by adding additional alloying elements during the laser cutting process that are not present in the as-cast panel.

According to the present non-limiting example, the second multi-phase microstructure includes an intermetallic phase of $Mg_{17}Al_{12}$ particles dispersed throughout a magnesium-rich matrix phase. The $Mg_{17}Al_{12}$ particles of the second multi-phase microstructure are present at a second distribution greater than the first distribution of $Mg_{17}Al_{12}$ particles in the first multi-phase microstructure. The greater distribution of $Mg_{17}Al_{12}$ particles provides the peripheral region with a greater corrosion resistance than that of the central region. The distribution of $Mg_{17}Al_{12}$ particles is increased by adding aluminum alloying material to the molten material of the cutting area during the laser cutting process. In various aspects, the distribution of $Mg_{17}Al_{12}$ particles is increased depending on various parameters of the laser cutting process.

According to the present disclosure, the cast panel can be mass produced from an as-cast panel formed using a conventional casting process for casting magnesium alloy panels. An exemplary manufacturing system includes a suitable casting apparatus, a laser cutting apparatus and, optionally, an edge finishing apparatus. The laser cutting apparatus is similar to the laser cutting apparatus 134. In various implementations, the edge finishing apparatus is used to smooth the edge created by the laser cutting apparatus. In various aspects, the manufacturing system further includes a surface treatment apparatus, an assembling apparatus, and a final finishing apparatus similar to the surface treatment apparatus 136, the assembling apparatus 138, and the final finishing apparatus 140.

In an exemplary method, the casting apparatus forms an as-cast panel having an overall desired three dimensional shape of a finished panel. The as-cast panel includes a first multi-phase microstructure including an intermetallic phase dispersed in a magnesium-rich matrix phase. In various aspects, the intermetallic phase does not provide sufficient corrosion resistance. The laser cutting apparatus cuts the as-cast panel using a predetermined laser cutting process to produce a cut panel including a corrosion-resistant edge. The laser cutting process alters the first multi-phase microstructure of the as-cast panel, creating a second multi-phase microstructure different from the first multi-phase microstructure. The second multi-phase microstructure includes a corrosion resistant intermetallic phase dispersed in a magnesium-rich matrix phase.

In various implementations, the intermetallic phase is created by adding an alloying element to the molten material of the cutting area during the laser cutting process. In various aspects, the alloying element is present in the as-cast panel or, alternatively, is an additional alloying element having corrosion-resistant properties. In further aspects, an intermetallic phase is present in both the first and second multi-phase microstructures, yet has a greater distribution within the second multi-phase microstructure. In still further aspects, the distribution of the intermetallic phase within a region of the second multi-phase microstructure is relatively uniform or, optionally, increases in a direction from a central region of the cast panel towards the edge.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A manufacturing system for mass producing magnesium alloy panels, comprising: a forming apparatus configured to form a panel comprising magnesium having a three dimensional shape and a first corrosion resistance; and a laser cutting apparatus comprising a laser and a feeding apparatus, wherein the laser is configured to cut the panel to form an edge comprising a molten material, and the feeding apparatus is configured to introduce an alloying element as a solid wire to the molten material adjacent to a region of the panel where the laser cuts so as to create an intermetallic phase in the region to provide a second corrosion resistance greater than the first corrosion resistance.

2. The manufacturing system of claim 1, wherein the panel comprising magnesium has N phases and the region of the panel having the second corrosion resistance has N+M phases, N and M being integers greater than zero.

3. The manufacturing system of claim 1, wherein the panel comprising magnesium further comprises aluminum, zinc, tin, manganese, or combinations thereof.

4. The manufacturing system of claim 1, wherein the alloying element is an alloying element present in the panel as received by the laser cutting apparatus.

5. The manufacturing system of claim 1, wherein the alloying element is not present in the panel as received by the laser cutting apparatus.

6. The manufacturing system of claim 1, wherein the forming apparatus forms the panel using one of a stamping process and a hot metal gas forming process.

7. The manufacturing system of claim 1, wherein the forming apparatus forms the panel by casting the panel.

8. The manufacturing system of claim 1, wherein the alloying element is selected from a group consisting of: aluminum, zinc, tin, manganese, rare earth metals, magnesium, and combinations thereof.

9. The manufacturing system of claim 1, wherein the panel comprises an alloy of magnesium, aluminum, and zinc.

10. The manufacturing system of claim 9, wherein the intermetallic phase comprises $Mg_{17}Al_{12}$.

11. A method for mass producing magnesium alloy panels, comprising:
    forming a panel comprising magnesium having a first corrosion resistance;
    cutting the panel to form an edge comprising a molten material using a laser; and
    introducing an alloying element as a solid wire to the molten material adjacent to a region of the panel where the laser cuts so as to create an intermetallic phase in the region to provide a second corrosion resistance greater than the first corrosion resistance.

12. The method of claim 11, further comprising forming the panel using one of a hot metal gas forming process, a stamping process, and a casting process.

13. The method of claim 11, wherein the panel comprising magnesium further comprises aluminum, zinc, tin, manganese, or combinations thereof.

14. The method of claim 11, wherein
    the introducing of the alloying element is to the molten material in a cutting area generated while cutting the panel to form the edge using the laser.

15. The method of claim 14, wherein the alloying element is not present in the panel when forming the panel.

16. The method of claim 14, wherein the alloying element is an alloying element present in the panel when forming the panel.

17. A manufacturing system for mass producing magnesium alloy panels, comprising: a forming apparatus configured to form a panel comprising magnesium having a three dimensional shape and a first corrosion resistance; a laser cutting apparatus comprising a laser and a feeding apparatus, wherein the laser is configured to cut the panel to form an edge comprising a molten material, and the feeding apparatus is configured to introduce an alloying element as a solid wire to the molten material adjacent to a region of the panel where the laser cuts so as to create an intermetallic phase in the region to provide a second corrosion resistance greater than the first corrosion resistance; and a finishing apparatus configured to apply a surface treatment to the panel, wherein the finishing apparatus is further configured to selectively omit applying the surface treatment to the edge.

18. The manufacturing system of claim 17, wherein the panel comprising magnesium has N phases and the region of the panel having the second corrosion resistance has N+M phases, N and M being integers greater than zero.

19. The manufacturing system of claim 17, wherein the panel comprises an alloy of magnesium, aluminum, and zinc.

20. The manufacturing system of claim 19, wherein the intermetallic phase comprises $Mg_{17}Al_{12}$.

* * * * *